(12) United States Patent
Compton et al.

(10) Patent No.: US 7,778,974 B2
(45) Date of Patent: Aug. 17, 2010

(54) APPARATUS AND METHOD TO ARCHIVE LOG ENTRIES FORMED BY A DATA STORAGE SYSTEM

(75) Inventors: Matthew Charles Compton, Tucson, AZ (US); Stefan Lehmann, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 11/872,016

(22) Filed: Oct. 14, 2007

(65) Prior Publication Data

US 2009/0100111 A1 Apr. 16, 2009

(51) Int. Cl.
G06F 7/00 (2006.01)
(52) U.S. Cl. .................... 707/648; 707/640; 707/644
(58) Field of Classification Search .................. None
See application file for complete search history.

(56) References Cited

U.S. PATENT DOCUMENTS

| | | | |
|---|---|---|---|
| 5,155,850 A | 10/1992 | Janis et al. | |
| 5,471,631 A | 11/1995 | Beardsley et al. | |
| 5,613,113 A | 3/1997 | Goldring | |
| 6,275,826 B1 * | 8/2001 | Geiner et al. | 707/101 |
| 6,879,995 B1 * | 4/2005 | Chinta et al. | 709/204 |
| 6,931,355 B2 | 8/2005 | Farrell et al. | |
| 7,089,156 B2 | 8/2006 | Takayasu et al. | |
| 7,171,401 B2 | 1/2007 | Tanaka | |
| 2004/0215708 A1 | 10/2004 | Higashi et al. | |
| 2005/0021571 A1 | 1/2005 | East | |
| 2006/0036601 A1 * | 2/2006 | Dudley et al. | 707/8 |
| 2006/0225073 A1 | 10/2006 | Akagawa et al. | |
| 2006/0270389 A1 | 11/2006 | Maes | |

OTHER PUBLICATIONS

"Chapter 8 Understanding Log Files," Sun Microsystems, Inc., 2000. <http://www.santa-cruz.com/manual/ag/esmonsvr.htm>.*
"7 Managing Archived Redo Logs," Oracle8i Administrator's Guide Release 2 (8.1.6), Oracle Corporation, 2000. <http://www.ecst.csuchico.edu/~oracle/server.817/a76956/archredo.htm>.*

* cited by examiner

Primary Examiner—Tim T. Vo
Assistant Examiner—Aaron Sanders
(74) Attorney, Agent, or Firm—Dale F. Regelman; Quarles & Brady LLP

(57) ABSTRACT

A method to archive log entries created by a data storage system comprising a first memory and a library log encoded in that first memory, wherein the first memory comprises a storage capacity, and wherein the method writes a plurality of log entries to the library log, wherein each log entry comprises a log entry time. At a time $T_0$, the method copies to a log archive the plurality of log entries written to the library log, and sets a subsequent retrieval time based upon a time $T_1$ when an earliest log entry was written to the library log, and a time $T_2$ when a latest log entry was written to the library log.

6 Claims, 3 Drawing Sheets

APPARATUS AND METHOD TO ARCHIVE LOG ENTRIES FORMED BY A DATA STORAGE SYSTEM

FIELD OF THE INVENTION

The invention relates to an apparatus and method to archive log entries formed by a data storage system.

BACKGROUND OF THE INVENTION

Data storage systems are used to store information provided by one or more host computer systems. Such data storage and retrieval systems receive requests to write information to one or more data storage devices, and requests to retrieve information from those one or more data storage devices.

Such data storage systems often maintain library logs comprising a plurality of log entries. Prior art systems and methods may download such a library log for analysis. Depending on the workload of the data storage system, these prior art systems and methods may not download the library log frequently enough resulting in loss of one or more log entries.

SUMMARY OF THE INVENTION

The invention comprises an apparatus and method to archive log entries created by a data storage system comprising a first memory and a library log encoded in that first memory, wherein the first memory comprises a storage capacity. The method writes a plurality of log entries to the library log, wherein each log entry comprises a log entry time. The method further encodes a log archive in a second memory, wherein that second memory is external to the data storage system.

The method sets a time $T_0$ equal to current time, copies to the log archive the plurality of log entries written to the library log, clears the first memory, determines a time $T_1$ when an earliest log entry was written to the library log, and determines a time $T_2$ when a latest log entry was written to the library log. The method calculates a retrieval interval $T_{INT}$ equal to $(T_2-T_1)$, and sets a retrieval time equal to $(T_0+T_{INT})$.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The invention is described herein in the context of a data processing system comprising one or more data storage systems. This description should not be interpreted to limit the invention described and claimed herein to data processing systems. Rather, Applicants' invention can be implemented in any computing device that maintains a system log. In addition, various examples are recited herein to further illustrate to persons skilled in the art how to make and use the invention. These examples are not intended as limitations, however, upon the scope of the invention.

Figure 1:
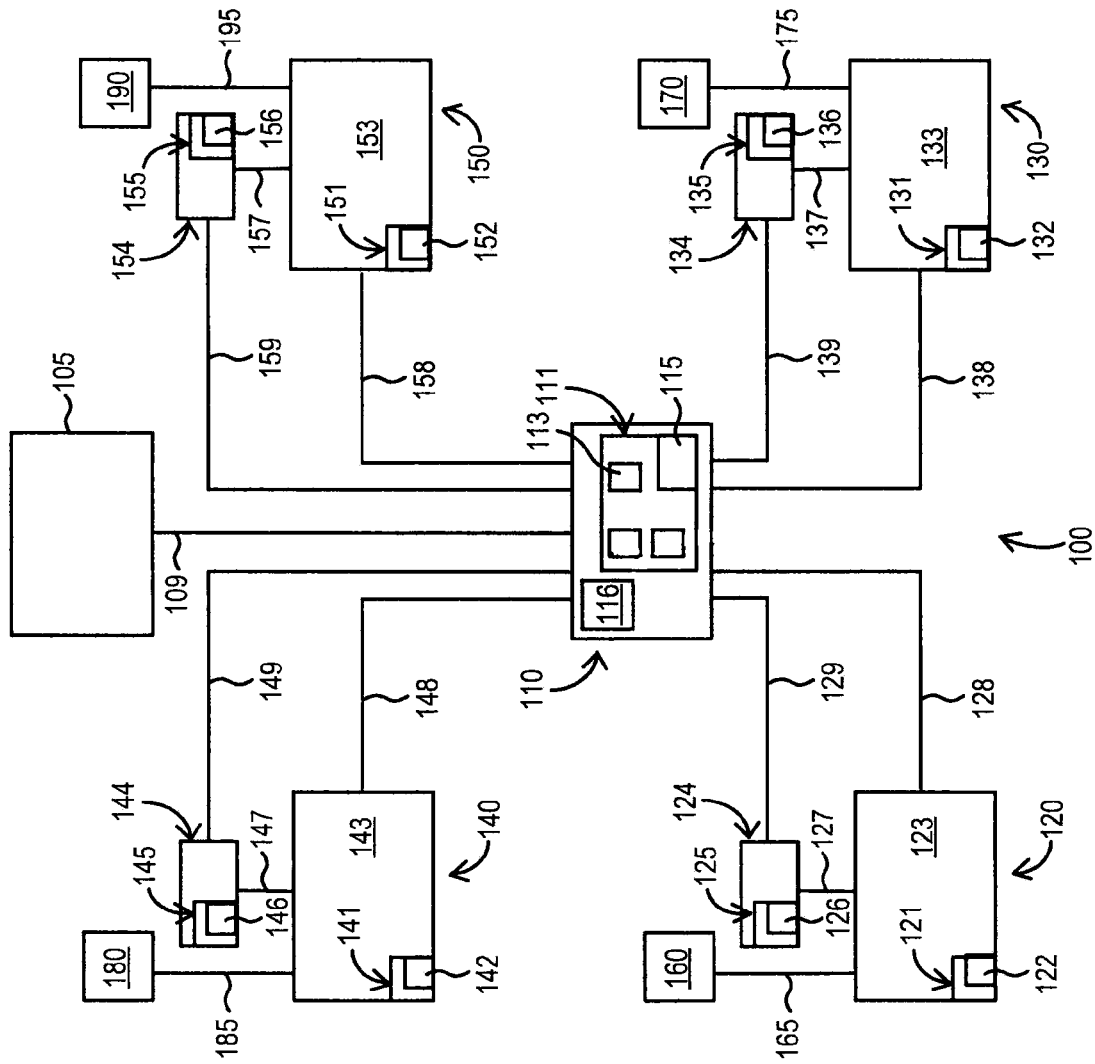
FIG. 1 is a block diagram showing one embodiment of Applicants' data processing system.

FIG. 1 illustrates one embodiment of Applicants' data processing system 100. In the illustrated embodiment of FIG. 1, data processing system 100 comprises system console 110, data storage systems 120, 130, 140, and 150, and computing devices 160, 170, 180, and 190. Computing device 160, 170, 180, and 190, are sometimes referred to as host computers.

As a general matter, hosts computers 160, 170, 180, and 190, each comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, one or more of host computers 160, 170, 180, and 190, further includes a storage management program. In certain embodiments, that storage management program may include the functionality of storage management type programs known in the art that manage the transfer of data to and from a data storage and retrieval system, such as for example and without limitation the IBM DFSMS implemented in the IBM MVS operating system.

Host computers 160, 170, 180, and 190, communicate with data storage systems 120, 130, 140, and 150, respectively, via communication links 165, 175, 185, and 195, respectively. Communication links 165, 175, 185, and 195, may comprise any type of I/O interface, for example and without limitation, ESCON, FICON, Fibre Channel, INFINIBAND, Gigabit Ethernet, Ethernet, TCP/IP, iSCSI, SCSI I/O interface, and the like.

In the illustrated embodiment of FIG. 1, data storage system 120 comprises library 123 and library manager 124. In the illustrated embodiment of FIG. 1, library 123 comprises memory 121 and library log 122 written to memory 121. Memory 121 comprises a storage capacity. In certain embodiments, memory 121 comprises non-volatile memory. In certain embodiments, memory 121 comprises a magnetic storage medium in combination with hardware, firmware, and software, needed to write information to, and read information from, that magnetic storage medium. In certain embodiments, memory 121 comprises an optical storage medium in combination with hardware, firmware, and software, needed to write information to, and read information from, that optical storage medium. In certain embodiments, memory 121 comprises an electronic storage medium in combination with hardware, firmware, and software, needed to write information to, and read information from, that electronic storage medium. In certain embodiments, memory 121 comprises a holographic storage medium in combination with hardware, firmware, and software, needed to write information to, and read information from, that holographic storage medium.

In the illustrated embodiment of FIG. 1, library manager 124 comprises memory 125 and library log 126 written to memory 125. Memory 125 comprises a storage capacity. In certain embodiments, memory 125 comprises non-volatile memory. In certain embodiments, memory 125 comprises a magnetic storage medium in combination with hardware, firmware, and software, needed to write information to, and read information from, that magnetic storage medium. In certain embodiments, memory 125 comprises an optical storage medium in combination with hardware, firmware, and software, needed to write information to, and read information from, that optical storage medium. In certain embodiments, memory 125 comprises an electronic storage medium in combination with hardware, firmware, and software, needed to write information to, and read information from, that electronic storage medium. In certain embodiments, memory 125 comprises a holographic storage medium in combination with hardware, firmware, and software, needed to write information to, and read information from, that holographic storage medium.

In the illustrated embodiment of FIG. 1, data storage system 120 comprises memory 121, library log, 122, memory 125, and library log 126. In other embodiments, data storage system comprises either memory 121 and library log 122 or memory 125 and library log 126.

As those skilled in the art will appreciate, there are various elements not illustrated in data storage system 120, such as a plurality of data storage devices, a plurality of data storage media, one or more robotic accessors used to transport portable data storage media to and from the data storage devices, and the like. In certain embodiments, data library 123 comprises a plurality of magnetic tapes and a plurality of magnetic tape drives. In certain embodiments, data library 123 comprises one or more virtual tape servers, a plurality of magnetic tapes, and a plurality of magnetic tape drives. In certain embodiments, data library 123 comprises one or more direct access storage devices ("DASDs") and a plurality of disk drives.

In the illustrated embodiment of FIG. 1, data storage system 130 comprises library 133 and library manager 134. In the illustrated embodiment of FIG. 1, library 133 comprises memory 131 and library log 132 written to memory 131. Memory 131 comprises a storage capacity. In certain embodiments, memory 131 comprises non-volatile memory. In certain embodiments, memory 131 comprises a magnetic storage medium in combination with hardware, firmware, and software, needed to write information to, and read information from, that magnetic storage medium. In certain embodiments, memory 131 comprises an optical storage medium in combination with hardware, firmware, and software, needed to write information to, and read information from, that optical storage medium. In certain embodiments, memory 131 comprises an electronic storage medium in combination with hardware, firmware, and software, needed to write information to, and read information from, that electronic storage medium. In certain embodiments, memory 131 comprises a holographic storage medium in combination with hardware, firmware, and software, needed to write information to, and read information from, that holographic storage medium.

In the illustrated embodiment of FIG. 1, library manager 134 comprises memory 135 and library log 136 written to memory 135. Memory 135 comprises a storage capacity. In certain embodiments, memory 135 comprises non-volatile memory. In certain embodiments, memory 135 comprises a magnetic storage medium in combination with hardware, firmware, and software, needed to write information to, and read information from, that magnetic storage medium. In certain embodiments, memory 135 comprises an optical storage medium in combination with hardware, firmware, and software, needed to write information to, and read information from, that optical storage medium. In certain embodiments, memory 135 comprises an electronic storage medium in combination with hardware, firmware, and software, needed to write information to, and read information from, that electronic storage medium. In certain embodiments, memory 135 comprises a holographic storage medium in combination with hardware, firmware, and software, needed to write information to, and read information from, that holographic storage medium.

In the illustrated embodiment of FIG. 1, data storage system 130 comprises memory 131, library log, 132, memory 135, and library log 136. In other embodiments, data storage system comprises either memory 131 and library log 132 or memory 135 and library log 136.

As those skilled in the art will appreciate, there are various elements not illustrated in data storage system 130, such as a plurality of data storage devices, a plurality of data storage media, one or more robotic accessors used to transport portable data storage media to and from the data storage devices, and the like. In certain embodiments, data library 133 comprises a plurality of magnetic tapes and a plurality of magnetic tape drives. In certain embodiments, data library 133 comprises one or more virtual tape servers, a plurality of magnetic tapes, and a plurality of magnetic tape drives. In certain embodiments, data library 133 comprises one or more direct access storage devices ("DASDs") and a plurality of disk drives.

In the illustrated embodiment of FIG. 1, data storage system 140 comprises library 143 and library manager 144. In the illustrated embodiment of FIG. 1, library 143 comprises memory 141 and library log 142 written to memory 141. Memory 141 comprises a storage capacity. In certain embodiments, memory 141 comprises non-volatile memory. In certain embodiments, memory 141 comprises a magnetic storage medium in combination with hardware, firmware, and software, needed to write information to, and read information from, that magnetic storage medium. In certain embodiments, memory 141 comprises an optical storage medium in combination with hardware, firmware, and software, needed to write information to, and read information from, that optical storage medium. In certain embodiments, memory 141 comprises an electronic storage medium in combination with hardware, firmware, and software, needed to write information to, and read information from, that electronic storage medium. In certain embodiments, memory 141 comprises a holographic storage medium in combination with hardware, firmware, and software, needed to write information to, and read information from, that holographic storage medium.

In the illustrated embodiment of FIG. 1, library manager 144 comprises memory 145 and library log 146 written to memory 145. Memory 145 comprises a storage capacity. In certain embodiments, memory 145 comprises non-volatile memory. In certain embodiments, memory 145 comprises a magnetic storage medium in combination with hardware, firmware, and software, needed to write information to, and read information from, that magnetic storage medium. In certain embodiments, memory 145 comprises an optical storage medium in combination with hardware, firmware, and software, needed to write information to, and read information from, that optical storage medium. In certain embodiments, memory 145 comprises an electronic storage medium in combination with hardware, firmware, and software, needed to write information to, and read information from, that electronic storage medium. In certain embodiments, memory 145 comprises a holographic storage medium in combination with hardware, firmware, and software, needed to write information to, and read information from, that holographic storage medium.

In the illustrated embodiment of FIG. 1, data storage system 140 comprises memory 141, library log, 142, memory 145, and library log 146. In other embodiments, data storage system comprises either memory 141 and library log 142 or memory 145 and library log 146.

As those skilled in the art will appreciate, there are various elements not illustrated in data storage system 140, such as a plurality of data storage devices, a plurality of data storage media, one or more robotic accessors used to transport portable data storage media to and from the data storage devices, and the like. In certain embodiments, data library 143 comprises a plurality of magnetic tapes and a plurality of magnetic tape drives. In certain embodiments, data library 143 comprises one or more virtual tape servers, a plurality of magnetic tapes, and a plurality of magnetic tape drives. In certain embodiments, data library 143 comprises one or more direct access storage devices ("DASDs") and a plurality of disk drives.

In the illustrated embodiment of FIG. 1, data storage system 150 comprises library 153 and library manager 154. In the illustrated embodiment of FIG. 1, library 153 comprises memory 151 and library log 152 written to memory 151. Memory 151 comprises a storage capacity. In certain embodiments, memory 151 comprises non-volatile memory. In certain embodiments, memory 151 comprises a magnetic storage medium in combination with hardware, firmware, and software, needed to write information to, and read information from, that magnetic storage medium. In certain embodiments, memory 151 comprises an optical storage medium in combination with hardware, firmware, and software, needed to write information to, and read information from, that optical storage medium. In certain embodiments, memory 151 comprises an electronic storage medium in combination with hardware, firmware, and software, needed to write information to, and read information from, that electronic storage medium. In certain embodiments, memory 151 comprises a holographic storage medium in combination with hardware, firmware, and software, needed to write information to, and read information from, that holographic storage medium.

In the illustrated embodiment of FIG. 1, library manager 154 comprises memory 155 and library log 156 written to memory 155. Memory 155 comprises a storage capacity. In certain embodiments, memory 155 comprises non-volatile memory. In certain embodiments, memory 155 comprises a magnetic storage medium in combination with hardware, firmware, and software, needed to write information to, and read information from, that magnetic storage medium. In certain embodiments, memory 155 comprises an optical storage medium in combination with hardware, firmware, and software, needed to write information to, and read information from, that optical storage medium. In certain embodiments, memory 155 comprises an electronic storage medium in combination with hardware, firmware, and software, needed to write information to, and read information from, that electronic storage medium. In certain embodiments, memory 155 comprises a holographic storage medium in combination with hardware, firmware, and software, needed to write information to, and read information from, that holographic storage medium.

In the illustrated embodiment of FIG. 1, data storage system 150 comprises memory 151, library log, 152, memory 155, and library log 156. In other embodiments, data storage system comprises either memory 151 and library log 152 or memory 155 and library log 156.

As those skilled in the art will appreciate, there are various elements not illustrated in data storage system 150, such as a plurality of data storage devices, a plurality of data storage media, one or more robotic accessors used to transport portable data storage media to and from the data storage devices, and the like. In certain embodiments, data library 153 comprises a plurality of magnetic tapes and a plurality of magnetic tape drives. In certain embodiments, data library 153 comprises one or more virtual tape servers, a plurality of magnetic tapes, and a plurality of magnetic tape drives. In certain embodiments, data library 153 comprises one or more direct access storage devices ("DASDs") and a plurality of disk drives.

In the illustrated embodiment of FIG. 1, system console 110 communicates with data library 123, library manager 124, data library 133, library manager 134, data library 143, library manager 144, data library 153, library manager 154, and support center 105, via communication links 128, 129, 138, 139, 148, 149, 158, 159, and 109, respectively. Communication links 128, 129, 138, 139, 148, 149, 158, 159, and 109, may comprise any type of I/O interface, for example and without limitation, ESCON, FICON, Fibre Channel, INFINIBAND, Gigabit Ethernet, Ethernet, TCP/IP, iSCSI, SCSI I/O interface, and the like.

In certain embodiments, system console 110 comprises an IBM TS3000 SYSTEM CONSOLE. In the illustrated embodiment of FIG. 1, system console 110 communicates with 4 data storage systems. In other embodiments, system console 110 communicates with more than 4 data storage systems. In yet other embodiments, system console 110 communicates with fewer than 4 data storage systems. In the illustrated embodiment of FIG. 1, system console 110 communicates with one support center In other embodiments, system console 110 communicates with more than one support center.

It is known in the art to create and maintain a library log, wherein that library log comprises a plurality of log entries, wherein each log entry comprises a time and a description of a library event. Such library events comprise, without limitation, read requests received from a host computer, write requests received from a host computer, error messages, and the like. A library log, such as for example library log 122, is written to a memory, such as memory 121, wherein that memory comprises a storage capacity. When the storage capacity of the memory is completely used, a subsequent log entry is written to the memory by overwriting the earliest log entry previously stored in the memory. This procedure is sometimes referred to as "log wrapping."

As those skilled in the art will appreciate, such log wrapping causes the loss of one or more log entries. Applicants' invention comprises a method to archive a library log by periodically retrieving that library log, and storing the retrieved plurality of log entries in a log archive. Applicants' method adaptively adjusts the time interval used to retrieve a library log to minimize and/or eliminate log wrapping.

Figure 2:
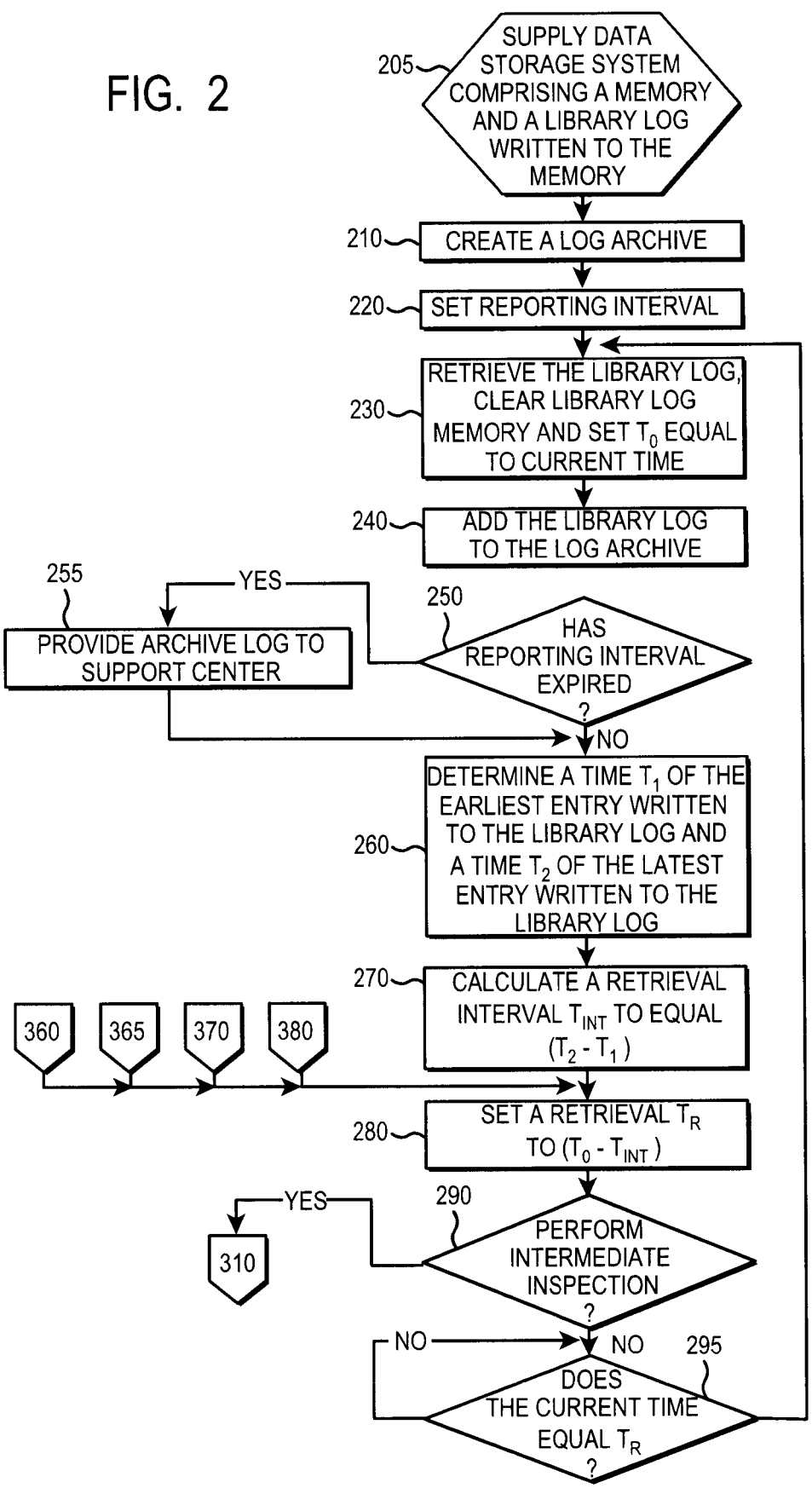
FIG. 2 summarizes the initial steps of Applicants' method.
Figure 3:
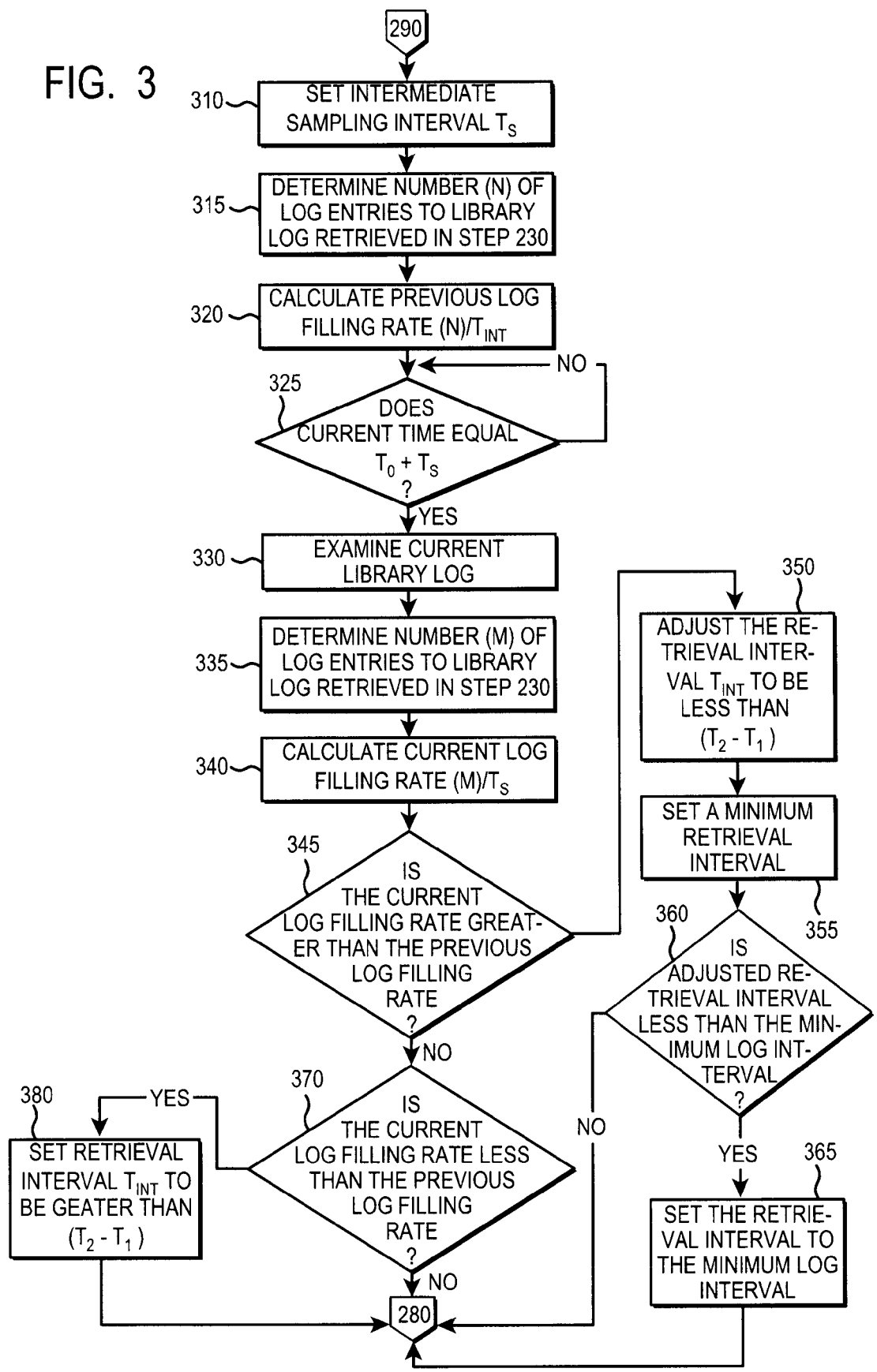
FIG. 3 summarizes certain additional steps of Applicants' method.

FIGS. 2 and 3, summarize the steps of Applicants' method. In embodiments wherein Applicants' data processing system comprises a plurality of data storage systems, Applicant's method is implemented separately and concurrently for each of the plurality of data storage systems.

Referring now to FIG. 2, in step 205 the method provides a data processing system comprising one or more data storage systems in communication with a system console, wherein each of the data storage systems creates and saves a library log in a memory.

In step 210, Applicants' method creates and saves a log archive, such as for example log archive 115 (FIG. 1). In certain embodiments, step 210 is performed by a system console, such as system console 110 (FIG. 1). In certain embodiments, step 210 is performed by a support center in communication with a system console, such as for example support center 105 (FIG. 1).

In step 220, Applicants' method sets a reporting interval, and monitor current time. At the expiration of each reporting interval, the method provides the log archive of step 210 to a support center. In embodiments wherein Applicants' method is implemented by a system console in communication with (N) data storage systems, wherein (N) is greater than 1, the method may set a different reporting interval for each of the (N) data storage systems. In addition, the method may provide one or more of the (N) log archives to a first support center and one or more of the (N) log archives to a second support center.

In certain embodiments, step 220 is performed by a system console, such as system console 110 (FIG. 1). In certain embodiments, step 220 is performed by a support center in communication with a system console, such as for example support center 105 (FIG. 1).

In step 230, the method retrieves a library log written to memory disposed in a data storage system. Further in step 230, the method clears the memory, and sets time $T_0$ equal to the current time. In certain embodiments, step 230 is performed by a system console, such as system console 110 (FIG. 1). In certain embodiments, step 230 is performed by a support center in communication with a system console, such as for example support center 105 (FIG. 1).

In step 240, the method writes a plurality of log entries comprising the library log of step 230 to the log archive of step 210. In certain embodiments, step 240 is performed by a system console, such as system console 110 (FIG. 1). In certain embodiments, step 240 is performed by a support center in communication with a system console, such as for example support center 105 (FIG. 1).

In step 250, the method determines if the reporting interval of step 220 has expired. In certain embodiments, step 250 is performed by a system console, such as system console 110 (FIG. 1). In certain embodiments, step 250 is performed by a support center in communication with a system console, such as for example support center 105 (FIG. 1).

If the method determines in step 250 that the reporting interval of step 220 has expired, then the method transitions from step 250 to step 255 wherein the method provides the archive log of step 210, as supplemented in step 240, to a designated support center In certain embodiments, step 255 is performed by a system console, such as system console 110 (FIG. 1). In certain embodiments, step 255 is performed by a support center in communication with a system console, such as for example support center 105 (FIG. 1).

In the illustrated embodiment of FIG. 2, steps 250 and 255 are shown being performed after step 240. In other embodiments, the method continuously monitors the current time to determine if the reporting interval has expired. Upon expiration of the reporting interval, the method provides the log archive of step 210 to a designated support center.

If the method determines in step 250 that the reporting interval of step 220 has not expired, then the method transitions from step 250 to step 260 wherein the method determines a time $T_1$ associated with the earliest log entry written to the library log retrieved in step 230, and a time $T_2$ associated with the latest log entry written to the library log retrieved in step 230. In certain embodiments, step 260 is performed by a system console, such as system console 110 (FIG. 1). In certain embodiments, step 260 is performed by a support center in communication with a system console, such as for example support center 105 (FIG. 1).

In step 270, the method calculates a retrieval interval $T_{INT}$ equal to $(T_2-T_1)$. In certain embodiments, step 270 is performed by a system console, such as system console 110 (FIG. 1). In certain embodiments, step 270 is performed by a support center in communication with a system console, such as for example support center 105 (FIG. 1).

In step 280, the method sets a retrieval time $T_R$ to equal $(T_0+T_{INT})$. In certain embodiments, step 280 is performed by a system console, such as system console 110 (FIG. 1). In certain embodiments, step 280 is performed by a support center in communication with a system console, such as for example support center 105 (FIG. 1).

In step 290, the method determines whether to perform an intermediate inspection of the library log created after time $T_0$. In certain embodiments, step 290 is performed by a system console, such as system console 110 (FIG. 1). In certain embodiments, step 290 is performed by a support center in communication with a system console, such as for example support center 105 (FIG. 1).

If the method elects to perform an intermediate inspection of the library log created after time $T_0$, then the method transitions from step 290 to step 310. If the method elects not to perform an intermediate inspection of the library log created after time $T_0$, then the method transitions from step 290 to step 295 wherein the method determines if the current time equals the retrieval time $T_R$. In certain embodiments, step 295 is performed by a system console, such as system console 110 (FIG. 1). In certain embodiments, step 295 is performed by a support center in communication with a system console, such as for example support center 105 (FIG. 1).

If the method determines in step 295 that the current time does not yet equal the retrieval time $T_R$, then the method continues to monitor the current time until the current time reaches retrieval time $T_R$. Alternatively, if the method in step 295 determines that the retrieval time $T_R$ has arrived, then the method transitions from step 295 to step 230 and continues as described herein.

Referring now to FIG. 3, in step 310 the method sets an intermediate sampling interval $T_S$, wherein that intermediate sampling interval $T_S$ is less than the retrieval interval $T_{INT}$. Further in step 310, the method sets an intermediate sampling time equal to $(T_0+T_S)$. In certain embodiments, step 310 is performed by a system console, such as system console 110 (FIG. 1). In certain embodiments, step 310 is performed by a support center in communication with a system console, such as for example support center 105 (FIG. 1).

In step 315 the method determines a number (N) of entries written to the library log between times $T_1$ and $T_2$. In certain embodiments, step 315 is performed by a system console, such as system console 110 (FIG. 1). In certain embodiments, step 315 is performed by a support center in communication with a system console, such as for example support center 105 (FIG. 1).

In step 320, the method calculates a previous log filling rate by dividing (N) by retrieval interval $T_{INT}$. In certain embodiments, step 320 is performed by a system console, such as system console 110 (FIG. 1). In certain embodiments, step 320 is performed by a support center in communication with a system console, such as for example support center 105 (FIG. 1).

In step 325, the method determines if the current time equals the intermediate sampling time of step 410. In certain embodiments, step 325 is performed by a system console, such as system console 110 (FIG. 1). In certain embodiments, step 325 is performed by a support center in communication with a system console, such as for example support center 105 (FIG. 1).

If the method determines in step 325 that the current time does not yet equal the intermediate sampling time then the method continues to monitor the current time until the current time reaches the intermediate sampling time. Alternatively, if the method in step 325 determines that the intermediate sampling time has arrived, then the method transitions from step 325 to step 330 wherein the method examines the entries written to the library log after time $T_0$. In certain embodiments, step 330 is performed by a system console, such as system console 110 (FIG. 1). In certain embodiments, step 330 is performed by a support center in communication with a system console, such as for example support center 105 (FIG. 1).

In step 335 the method determines a number (M) of entries written to the library log after time $T_0$. In certain embodiments, step 335 is performed by a system console, such as system console 110 (FIG. 1). In certain embodiments, step 335 is performed by a support center in communication with a system console, such as for example support center 105 (FIG. 1).

In step 340, the method calculates a current log filling rate by dividing (M) by intermediate sampling interval $T_S$. In certain embodiments, step 340 is performed by a system console, such as system console 110 (FIG. 1). In certain embodiments, step 340 is performed by a support center in communication with a system console, such as for example support center 105 (FIG. 1).

In step 345, the method determines if the current log filling rate of step 340 is greater than the previous log filling rate of step 320. In certain embodiments, step 345 is performed by a system console, such as system console 110 (FIG. 1). In certain embodiments, step 345 is performed by a support center in communication with a system console, such as for example support center 105 (FIG. 1).

If the method determines in step 345 that the current log filling rate is greater than the previous log filling rate, then the method transitions from step 345 to step 350 wherein the method adjusts the retrieval interval $T_{INT}$ to be less than the time interval ($T_2 - T_1$). In certain embodiments, step 350 is performed by a system console, such as system console 110 (FIG. 1). In certain embodiments, step 350 is performed by a support center in communication with a system console, such as for example support center 105 (FIG. 1).

In step 355, the method sets a minimum retrieval interval. Implementation of such a minimum retrieval interval prevents use of short retrieval intervals that inefficiently consume system resources. In certain embodiments, step 355 is performed by a system console, such as system console 110 (FIG. 1). In certain embodiments, step 355 is performed by a support center in communication with a system console, such as for example support center 105 (FIG. 1).

In step 360, the method determines if the adjusted retrieval interval of step 350 is less than the minimum retrieval interval of step 355. In certain embodiments, step 360 is performed by a system console, such as system console 110 (FIG. 1). In certain embodiments, step 360 is performed by a support center in communication with a system console, such as for example support center 105 (FIG. 1).

If the method determines in step 360 that the adjusted retrieval interval of step 350 is not less than the minimum retrieval interval, then the method transitions from step 360 to step 280 and continues as described herein. If the method determines in step 360 that the adjusted retrieval interval of step 350 is less than the minimum retrieval interval, then the method transitions from step 360 to step 365 wherein the method sets the retrieval interval to the minimum retrieval interval. The method transitions from step 365 to step 280 and continues as described herein.

If the method determines in step 345 that the current log filling rate is not greater than the previous log filling rate, then the method transitions from step 345 to step 370 wherein the method determines if the current log filling rate is less than the previous log filling rate.

If the method determines in step 370 that the current log filling rate is less than the previous log filling rate, then the method transitions from step 370 to step 380 wherein the method adjusts the retrieval interval $T_{INT}$ to be greater than the time interval ($T_2 - T_1$). In certain embodiments, step 380 is performed by a system console, such as system console 110 (FIG. 1). In certain embodiments, step 380 is performed by a support center in communication with a system console, such as for example support center 105 (FIG. 1). The method transitions from step 380 to step 280 and continues as described herein.

In certain embodiments, individual steps recited in FIGS. 2, 3, and/or 4 may be combined, eliminated, or reordered.

In certain embodiments, Applicants' invention includes instructions, such as instructions 113 (FIG. 1) written to computer readable medium 111 (FIG. 1), where those instructions are executed by a processor, such as processor 116 (FIG. 1), to perform one or more of steps 210, 220, 230, 240, 250, 260, 270, 280, 290, and/or 295, recited in FIG. 2, and/or one or more of steps 310, 315, 320, 325, 330, 335, 340, 345, 350, 360, 365, 370, and/or 380, recited in FIG. 3.

In other embodiments, Applicants' invention includes instructions residing in any other computer program product, where those instructions are executed by a processor external to, or internal to, system 100, to perform one or more of steps 210, 220, 230, 240, 250, 260, 270, 280, 290, and/or 295, recited in FIG. 2, and/or one or more of steps 310, 315, 320, 325, 330, 335, 340, 345, 350, 360, 365, 370, and/or 380, recited in FIG. 3. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to archive log entries created by a data storage system, comprising the steps of:
   providing a data storage system comprising first memory and a library log encoded in said first memory;

writing a plurality of log entries to said library log, wherein each log entry comprises a log entry time;

encoding a log archive in a second memory, wherein said second memory is external to said data storage system;

setting a time $T_0$ equal to current time;

at time $T_0$, copying to said log archive said plurality of log entries written to said library log;

determining a time $T_1$ when an earliest log entry was written to said library log;

determining a time $T_2$ when a latest log entry was written to said library log;

calculating a log interval $T_{INT}$ equal to $(T_2-T_1)$;

setting a retrieval time equal to $(T_0+T_{INT})$;

determining whether to perform an intermediate inspection of the library log;

when performing an intermediate inspection of the library log, determining a number (N) of log entries written to library log retrieved at time $T_0$;

establishing a previous log filling rate equal to $(N)/T_{INT}$;

setting an intermediate sampling interval $T_S$, wherein said intermediate sampling interval is less than said log interval;

setting an intermediate sampling time, wherein said intermediate sampling time equals $(T_0+T_S)$;

when current time equals said intermediate sampling time, inspecting the library log created after time $T_0$;

determining a number (M) of log entries written to the library log after time $T_0$;

establishing a current log filling rate equal to $(M)/T_S$;

determining whether said current log filling rate is greater than said previous log filling rate; and when said current log filling rate is greater than said previous log filling rate, adjusting said log interval $T_{INT}$ to be less than $(T_2-T_1)$.

2. The method of claim 1, further comprising the steps of:
setting a minimum log interval;
determining if said adjusted log interval is less than said minimum log interval; and
when said adjusted log interval is less than said minimum log interval, setting said log interval equal to said minimum log interval.

3. The method of claim 1, further comprising the steps of:
when said current log filling rate is not greater than said previous log filling rate, determining if said current log filling rate is less than said previous log filling rate; and
when said current log filling rate is less than said previous log filling rate, adjusting said log interval $T_{INT}$ to be greater than $(T_2-T_1)$.

4. An article of manufacture comprising a processor and a computer readable storage medium having computer readable program code disposed therein to archive a plurality of log entries stored by a data storage system in a first memory, wherein each log entry comprises a log entry time, the computer readable program code comprising a series of computer readable program steps to effect:

encoding a log archive in a second memory, wherein said second memory is external to said data storage system;

setting a time $T_0$ equal to current time;

at time $T_0$, copying to said log archive said plurality of log entries written to said library log;

determining a time $T_1$ when an earliest log entry was written to said library log;

determining a time $T_2$ when a latest log entry was written to said library log;

calculating a log interval $T_{INT}$ equal to $(T_2-T_1)$;

setting a retrieval time equal to $(T_0+T_{INT})$;

determining whether to perform an intermediate inspection of the library log;

when performing an intermediate inspection of the library log, determining a number (N) of log entries written to library log retrieved at time $T_0$;

establishing a previous log filling rate equal to $(N)/T_{INT}$;

setting an intermediate sampling interval $T_S$, wherein said intermediate sampling interval is less than said log interval;

setting an intermediate sampling time, wherein said intermediate sampling time equals $(T_0+T_S)$;

when current time equals said intermediate sampling time, inspecting the library log created after time $T_0$;

determining a number (M) of log entries written to the library log after time $T_0$;

establishing a current log filling rate equal to $(M)/T_S$;

determining whether said current log filling rate is greater than said previous log filling rate; and when said current log filling rate is greater than said previous log filling rate, adjusting said log interval $T_{INT}$ to be less than $(T_2-T_1)$.

5. The article of manufacture of claim 4, said computer readable program code further comprising a series of computer readable program steps to effect:
setting a minimum log interval;
determining whether said adjusted log interval is less than said minimum log interval; and
when said adjusted log interval is less than said minimum log interval, setting said log interval equal to said minimum log interval.

6. The article of manufacture of claim 4, said computer readable program code further comprising a series of computer readable program steps to effect:
when said current log filling rate is not greater than said previous log filling rate, determining if said current log filling rate is less than said previous log filling rate; and
when said current log filling rate is less than said previous log filling rate, adjusting said log interval TINT to be greater than (T2-T1).

\* \* \* \* \*